United States Patent [19]

Sobecks

[11] 4,070,859
[45] Jan. 31, 1978

[54] THERMAL FLUID DISPLACEMENT ACTUATOR

[75] Inventor: Ronald S. Sobecks, Seven Hills, Ohio

[73] Assignee: Design & Manufacturing Corporation, Willoughby, Ohio

[21] Appl. No.: 753,700

[22] Filed: Dec. 23, 1976

[51] Int. Cl.² .............................................. F03G 7/06
[52] U.S. Cl. ..................................................... 60/530
[58] Field of Search ................. 60/527, 528, 530, 531

[56] References Cited

U.S. PATENT DOCUMENTS 3,991,572  11/1976  Huebscher ............................ 60/531

FOREIGN PATENT DOCUMENTS 1,476,693  10/1970  Germany ................................ 60/530

*Primary Examiner*—Allen M. Ostrager
*Attorney, Agent, or Firm*—Donnelly, Maky, Renner & Otto

[57] ABSTRACT

An electro-thermal fluid displacement actuator includes a fixed volume boiler chamber and a variable volume actuation chamber formed by a ported partition being received in the main body of the actuator between a positive temperature coefficient heat source for the contained fluid and an elastomeric diaphragm. Upon energization of the heat source, a portion of the contained fluid vaporizes to increase the pressure in the boiler chamber resulting in displacement of some of the remainingfluid through the partition ports and into contact with the diaphragm to drive the same and the piston assembly mounted thereon through the predetermined stroke thereof. The displaced fluid contacting the diaphragm has a lower temperature than the fluid adjacent the heater because of its passage through the ported partition to a position remote from such heater, such reduction in fluid temperature resulting in a lower permeation rate for the fluid through the elastomer and consequently increasing the life of the actuator.

9 Claims, 3 Drawing Figures

THERMAL FLUID DISPLACEMENT ACTUATOR

BACKGROUND OF THE INVENTION

This invention relates to an electro-thermal fluid displacement actuator in general and to a ported insert partition for such an actuator having a positive temperature coefficient heater in particular.

In copending, co-assigned Huebscher application Ser. No. 623,669, filed Oct. 20, 1975, an electro-thermal linear actuator is disclosed and claimed in which a resistance type heating element is positioned in a variable volume chamber containing a fluid which undergoes a liquid to gas phase change upon being heated. Such phase change is used to increase the pressure in the variable volume chamber formed in part by an elastomeric diaphragm, with such increased pressure driving the diaphragm and piston assembly connected thereto through an expansion stroke. Upon the de-energization of such resistance heater, the fluid cools down to decrease the pressure in the variable volume chamber permitting a spring to return the piston assembly and diaphragm to the unexpanded inboard condition. The operational performance of the above-described electro-thermal linear actuator has been operationally quite satisfactory. However, over extended periods of use, the elastomeric diaphragm may age and undergo property changes caused by exposure to the high fluid temperatures involved, with such high temperatures causing permeation of the fluid through the elastomer. Moreover, the submerged resistance type heating element, if continuously energized during an actuator cycle, continues to increase in temperature resulting in damage either to the element itself or to the actuator assembly.

Reference may also be made to Schweitzer U.S. Pat. No. 3,132,472 wherein a thermal actuator for valves or the like is disclosed. Such actuator includes a substantially completely filled pressure vessel in which an open bottom, bell shaped member is positioned to define the boiler chamber therewithin, such boiler chamber directly communicating with the vessel through its open bottom.

SUMMARY OF THE INVENTION

To overcome the potential problems caused by extended actuator use or by inadvertent continuous heater energization, the present invention among other things includes a positive temperature coefficient (PTC) heater in a fixed volume boiler chamber. Such PTC heater reaches a predetermined temperature level that is subsequently maintained, with such temperature level being selected to provide the desired actuator response without actuator damage. Although PTC heaters have been positioned outside wax type actuating chambers as shown in Berg, U.S. Pat. No. 3,686,857 and Marcoux, U.S. Pat. No. 3,782,121 or in the liquid of a liquid-vapor variable volume chamber as shown in Arff U.S. Pat. No. 3,834,165, the placement of a PTC heater in the fixed volume boiler chamber containing the fluid as disclosed herein provides the necessary control while improving the heat exchange relationship between the PTC heater and the fluid. In addition, a high temperature plastic liner or sleeve for the boiler chamber may be used to reduce the heat losses to ambient to provide more rapid actuator response with lower power requirements. Such liner, which may be an integral part of the partition, also serves as an insulator between the PTC electrodes and metal actuator housing.

Moreover, by using a ported partition between the boiler chamber and the actuator chamber, the fluid displaced through such partition by the increased pressure in the boiler chamber during heater energization has a lower temperature because of its passage through the partition to a position physically remote from the heater. This lower temperature displaced fluid contacts and expands the elastomeric diaphragm by filling the variable volume chamber, thereby to drive the same through its expansion or outward stroke. This decreased fluid temperature results in the permeation rate for the elastomeric diaphragm being lower because the permeation of an elastomer decreases as the fluid temperature decreases. By so reducing the permeation rate, the useful life of the actuator is extended because the working fluid is contained for additional operational cycles. In addition, the lower temperature at the elastomeric diaphragm reduces the aging process and property changes of the same due to heat, thus extending the useful life of the diaphragm.

It is accordingly the principal object of the invention to provide a thermal, fluid displacement actuator having an increased life caused by better working fluid containment and by increased diaphragm life.

It is another object of the invention to provide a ported partition in the actuator housing between the heater and the diaphragm. Such ported partition thus divides the fixed volume boiler chamber from the variable volume actuation chamber and results in the temperatures of the displaced fluid in the variable volume actuation chamber being lower.

It is yet another object of the present invention to provide a PTC heater in the fixed volume boiler chamber, with such PTC heater being at least partially submerged in the fluid. This arrangement permits rapid heat-up of the fluid because of the significant direct surface contact between the fluid and heater, controls the maximum temperature achieved in the boiler chamber to a predetermined level, and results in accelerated cool-down of the heater because of the significant surface contact between the relatively cooler fluid and the PTC heater.

It is still another object of the present invention to position a PTC heater in a thermally and electrically insulated boiler chamber. Such insulation decreases heat losses to ambient to provide more rapid actuator response, with less operating power required to maintain a continuous outstroke.

Other objects and advantages of the present invention will become apparent as the following description proceeds.

To the accomplishment of the foregoing and related ends the invention, then, comprises the features hereinafter fully described and particularly pointed out in the claims, the following description and the annexed drawing setting forth in detail a certain illustrative embodiment of the invention, this being indicative, however, of but one of the various ways in which the principle of the invention may be employed.

A BRIEF DESCRIPTION OF THE DRAWING

DESCRIPTION OF THE PREFERRED EMBODIMENTS

Figure 1:
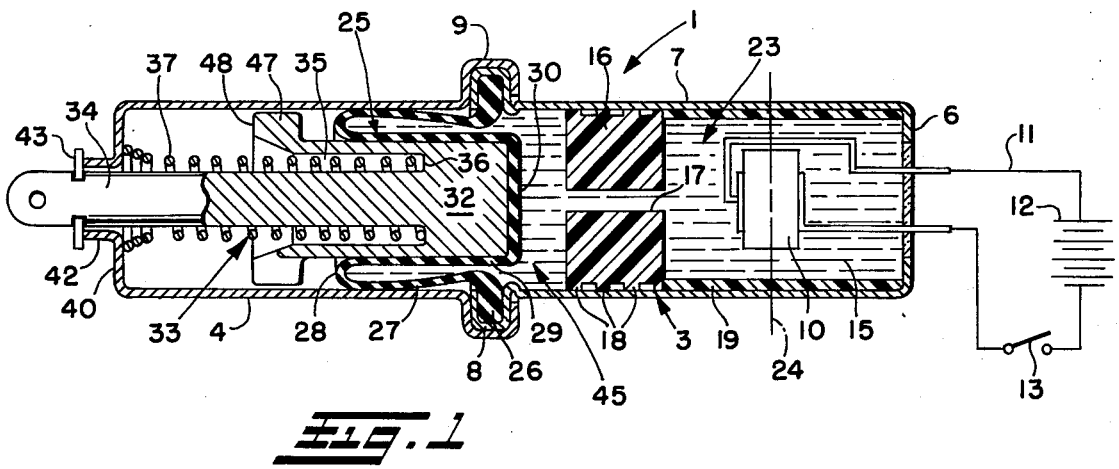
FIG. 1 is a sectional elevation of the thermal fluid displacement actuator with the heater de-energized and the diaphragm and piston at the instroke position.
Figure 2:
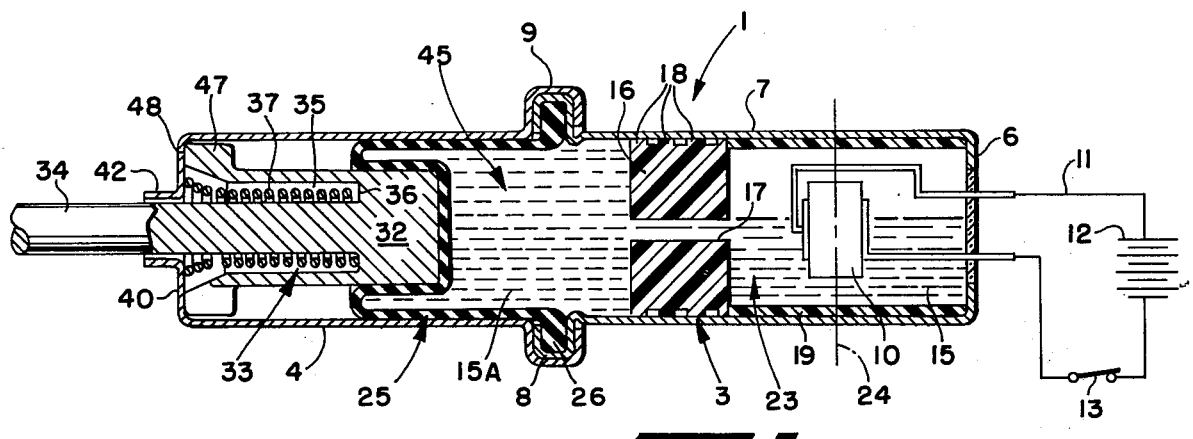
FIG. 2 is a sectional elevation similar to FIG. 1 with the heater energized and the diaphragm and piston at the fully expanded outstroke position.

Referring now in more detail to the drawing and initially to FIGS. 1 and 2, the electro-thermal fluid displacement actuator, indicated generally at 1, includes a housing consisting of a generally cylindrical casing 3 interconnected with a generally cylindrical guide cap 4. The cylindrical casing 3 includes an end wall 6, an annular side wall 7, and a radially outwardly extending but inwardly facing annular channel 8. Such channel 8 is internested in and joined to a similar radially outwardly extending but inwardly facing channel 9 on the cap 4, thereby to complete the actuator housing.

A heater element 10, preferably a positive temperature coefficient thermistor (PTC), is positioned in the void defined by the cylindrical casing 3. Such PTC heater 10 is part of an A.C. or D.C. electrical circuit 11 including a power source 12 which is energized by the switch 13 being closed (FIG. 2) or deenergized by the switch 13 being opened (FIG. 1). During periods of continuous electrical energization, the PTC heater is self-regulating and maintains a preselected temperature level in well known manner. Such preselected maintained temperature level provides for a controlled system response without risking element or actuator damage potentially present with a coiled resistance type heating element. The details of the preferred PTC heater, which is cylindrical in shape, are disclosed and claimed in a concurrently filed copending application assigned to the assignee of the present application.

The cylindrical casing 3 is substantially completely filled with a thermally expansible and contractible pressure transmitting fluid 15 capable of undergoing a liquid-gas phase change upon heating, such as a fluorinated hydrocarbon (Freon), a fluorocarbon, an alcohol, or other electrically non-conductive fluid of similar properties. Such fluid 15 is retained in the casing 3 by a cylindrical partition or barrier 16, which is press-fit into and tightly engages the inner diameter of the annular side wall 7 of cylindrical casing 3. Such partition, which is preferably made from a high temperature plastic, such as the plastics sold by General Electric under the LEXAN and VALOX trademarks, is provided with one or more relatively small diameter bores 17 passing therethrough for a function to be discussed in more detail hereinafter. Moreover, the partition 16 preferably has a plurality of radially outwardly extending projections 18 that engage the inner diameter of casing 3 and frictionally hold the partition in the position selected during press fitting.

Figure 3:
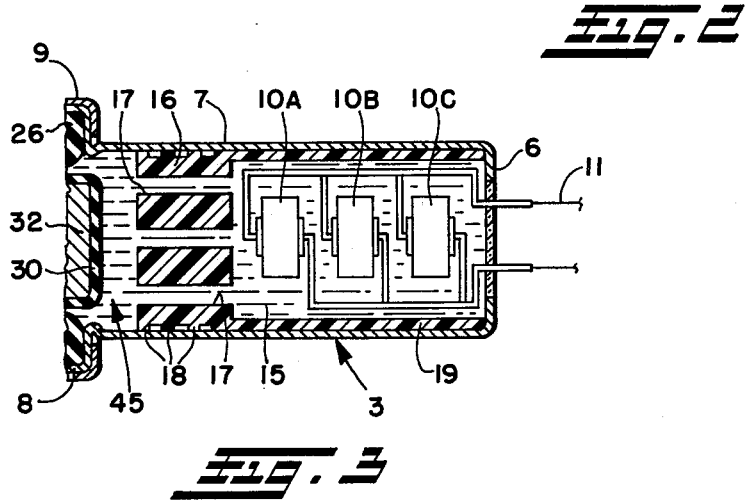
FIG. 3 is a partial sectional elevation showing a slightly different form of ported partition insert and a plurality of de-energized positive temperature coefficient heaters connected in parallel electrical relationship.

As shown in FIG. 3, the partition 16 may have a cylindrical projection extending toward and into abutting engagement with the inside surface of end wall 6, with such projection forming a liner or sleeve 19 for the boiler chamber. Alternatively, and as shown in FIGS. 1 and 2, the sleeve 19 may be a separately formed member of high temperature plastic. In either event, such sleeve 19 acts to retain the heat in the boiler chamber 23 to reduce heat losses to ambient, thereby to provide more rapid actuator responses at lower operating powers. Moreover, such sleeve 19 serves as an electrical insulator between the PTC electrodes and the metal casing 3.

As shown, such fixed volume boiler chamber 23 is cooperatively defined by partition 16, liner 19 and end wall 6 and contains fluid 15 which surrounds the heater 10. By thus surrounding the heater, the overall surface contact between the fluid 15 and PTC heater 10 is maximized and, of course, the entire midplane 24 of the PTC heater, which reaches the control temperature first in known manner, is in contact with the fluid about its entire circumferential extent. This increased or maximized surface contact accelerates the actuation rate for the diaphragm during heating and also accelerates cool down of the heater after de-energization for faster return of the diaphragm.

Such elastomeric diaphragm 25, which is preferably made from a post cured B. F. Goodrich HYDRIN 100 or HYDIN 200 compound or blend thereof and which may be reinforced by fabric backing or the like, has a generally radially oriented, annular toe ring 26 tightly received in channel 8 of casing 3. Such toe ring 26 is secured in such position by the internested channels 8 and 9 being crimped into positive engagement therewith to effectuate assemblage of the parts. The radially oriented toe ring 26 of the diaphragm 25 smoothly merges into a generally cylindrical, axially oriented leg portion 27 which is folded radially inwardly at 28 to define a cylindrical cap portion 29 which terminates in flat circular wall 30. The cylindrical cap portion 29 of elastomeric diaphragm 25 tightly receives and embraces a piston 32.

Such piston 32, which is part of a piston assembly 33 including an outwardly extending piston rod 34, is provided with an annular recess 35 having a bottom wall 36, such recess receiving one end of return spring 37 which bears against such bottom wall 36. Such spring 37 generally surrounds the piston rod 34 and bears at its other end against end wall 40 for guide cap 4. Such end wall 40 is provided with a hollow boss 42 through which piston rod 34 extends, such hollow boss being only slightly larger in diameter than the piston rod to assist in guiding the latter during its linear movements. As will be appreciated, the piston assembly 33 is normally biased to the right as viewed in FIGS. 1 and 2 by spring 37 resulting in the radially outwardly extending shoulder 43 on the piston rod 34 engaging the left face of boss 42. Such shoulder engagement limits the contraction travel of the piston assembly and diaphragm so that the latter is slightly axially separated from the partition 16 at its instroke position as shown in FIG. 1.

The diaphragm 25, partition 16 and the left end of casing 3 define therebetween a variable volume chamber 45. During energization of the PTC heater 10, the thermally expansible fluid 15 at least partially surrounding the heater 10 begins to vaporize to increase the pressure in boiler chamber 23, with such vaporization being accelerated by the fluid being in direct surface contact with the PTC heater. As shown in FIG. 3, such vaporization can be even further accelerated by increasing the contacted surface area by using three PTC heaters 10A, 10B and 10C in parallel. Such increased pressure caused by the vaporization of a part of the fluid forces some of the remaining fluid 15A through the bores 17 in partition 16 and thence into engagement with diaphragm 25. This diaphragm engagement by the displaced fluid 15A forces the diaphragm 25 and piston assembly 33 to the left as viewed in FIG. 1, thereby increasing the volume of the variable volume chamber 45 being filled by such displaced fluid 15A.

As described in more detail in the above-referenced Huebscher application Ser. No. 623,669, now U.S. Pat. No. 3,991,572 such piston and diaphragm movement to the left is rather closely controlled to provide a well guided linear output for piston rod 34. In this regard, the appreciable surface contact between the cylindrical leg portion 27 of diaphragm 25 and the inner diameter of the guide cap 4 during diaphragm expansion assists the hollow boss 42 in providing such guidance function. Moreover, the piston 32 may be provided with an outwardly flared distal skirt 47 positioned in close proximity to the guide cap 4 to further assist in the guidance. As will be readily appreciated, such guided expansion is accomplished by the diaphragm rolling at the fold 28 to permit the cylindrical leg portion 27 to become longer while the cylindrical cap 29 becomes correspondingly shorter.

The maximum outstroke travel for the diaphragm 25 and piston assembly 33 is illustrated in FIG. 2 wherein the end face 48 of distal skirt 47 engages the end wall 40 of guide cap 4. It will be appreciated that the volume of the displaced fluid 15A entering the variable volume chamber 45 defines the magnitude of stroke that is obtained from the actuator and the selected temperature for the PTC heater controls the magnitude of output force. Moreover, the temperature of the displaced fluid in the variable volume chamber 45 is lower than the temperature of the fluid in boiler chamber 23 because of its passage through partition 16 and its physical removal from heater proximity. The lower temperature for the displaced fluid is beneficial because the permeation rate for elastomeric materials increases as the fluid temperature increases. By reducing such temperature, the permeation rate is accordingly reduced to enhance the operational life of the actuator by prolonging the confinement of the working fluid. Also, the reduced temperature of the working fluid in the variable volume chamber 45 avoids or significantly decreases property changes in the elastomer and thus prolongs the life of the diaphragm.

Although the actuator 1 has been illustrated in a horizontal orientation, it may be placed at any orientation including vertical. In the latter position with the boiler chamber on the bottom, for example, the energization of the heater causes vaporization that may result in fluid in liquid phase being forced through the passages 17 in partition 16 because of the increased pressure and/or may result in the fluid in vapor phase passing through the partition 16 for probable recondensation to liquid in the cooler variable volume chamber. Because of the closed system, it is impossible to determine how much liquid passes through the partition versus how much vapor passes through the partition to recondense as liquid in any orientation, but in either or both events, the result is the same with the variable volume chamber being expanded by displaced fluid. The term displaced fluid as used herein means the fluid in the variable volume chamber in whatever state whether it originally came to such chamber in liquid form or in a gaseous or vaporous form, and the term fluid is similarly used to encompass both liquids and gases and/or mixtures thereof.

When the system is de-energized by opening switch 13, either manually or automatically by a feedback system (not shown) sensing the end of the outboard stroke, the heater 10 (or heaters 10A-C) is de-energized resulting in cool-down of the same and the fluid 15. This cool-down is accelerated by mounting the actuator 1 to the surrounding structure by a metal bracket (not shown) secured to the outside diameter of casing 3 at a position preferably adjacent the internested channels 8 and 9, such bracket being operative to conduct heat away from the actuator. When the fluid has cooled and/or recondensed to a predetermined extent, the spring 37 will overcome the reduced pressure in the boiler chamber and begin to force the piston assembly to the right to return the same to the inboard position shown in FIG. 1, thereby to complete the actuator cycle with shoulder 43 on piston rod 34 acting as a stop for such return movement. The return of the piston assembly will force most of the displaced fluid 15A back through the bore(s) 17 in partition 16 and thence into the boiler chamber 23, although a small portion of the displaced fluid may remain in the convolution of the diaphragm 25 and in the limited space between the diaphragm 25 and partition 16.

I, therefore, particularly point out and distinctly claim as my invention:

1. A thermal fluid displacement actuator comprising a body, a variable volume fluid chamber in said body formed in part by a diaphragm, a piston assembly on one side of said diaphragm and movable therewith to transmit force by such movement, a fixed volume boiler chamber in said body containing a thermally expansible and contractible force transmitting fluid, heating means to apply heat to at least a portion of said fluid to increase the pressure in the boiler chamber, and barrier means between said boiler chamber and said variable volume chamber, said barrier means having port means therethrough to provide limited fluid communication between said chambers to permit at least some of the fluid remaining in said boiler chamber to be displaced by the increased pressure through said port means to drive said diaphragm and piston assembly through an expansion stroke.

2. The thermal fluid displacement actuator of claim 1 wherein the barrier means consists of plastic partition tightly received in said body to form a common wall for said boiler chamber and said variable volume chamber.

3. The thermal fluid displacement actuator of claim 2 wherein said partition has integrally formed therewith a liner for the boiler chamber, thereby thermally and electrically to insulate the same.

4. The thermal fluid displacement actuator of claim 3 further including spring means normally to bias the piston assembly and diaphragm into a contracted position slightly axially spaced from the partition, whereby the contraction stroke is positively effectuated by said spring upon de-energization of said heating means.

5. The thermal fluid displacement actuator of claim 2 further including a plastic liner in said boiler chamber electrically and thermally to insulate the same.

6. The thermal fluid displacement actuator of claim 1 wherein said heating means includes at least one positive temperature coefficient heater positioned in said boiler chamber and at least partially submerged in said fluid contained therein.

7. The thermal fluid displacement actuator of claim 1 wherein said heating means includes a plurality of positive temperature coefficient heaters positioned in said boiler chamber to be at least partially submerged in said fluid, thereby to expose significant heater surface areas to said fluid to accelerate fluid heating during energization and heater cooling after de-energization.

8. The thermal fluid displacement actuator of claim 1 wherein said diaphragm is made from an elastomeric material and is configured to provide a rolling action with said body during expansion and contraction movements thereof.

9. A thermal actuator comprising a body, a variable volume chamber in said body formed in part by a diaphragm, a fixed volume chamber in said body, a barrier between said fixed and variable volume chambers having at least one port extending therethrough to establish fluid communication therebetween, a thermally expansible and contractible pressure transmitting medium in said body and at least partially surrounding a positive temperature coefficient heating means positioned in said fixed volume chamber, said heating means selectively being energized to increase the pressure in the fixed volume chamber to displace the medium through the port and against the diaphragm to increase the volume of said variable volume chamber.

* * * * *